(12) United States Patent
Harris

(10) Patent No.: US 8,382,153 B2
(45) Date of Patent: Feb. 26, 2013

(54) CHILD CAR SEAT FOR A LAND VEHICLE

(75) Inventor: Inga Harris, Glasgow (GB)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/319,695

(22) PCT Filed: May 14, 2009

(86) PCT No.: PCT/IB2009/052020
§ 371 (c)(1),
(2), (4) Date: Nov. 10, 2011

(87) PCT Pub. No.: WO2010/131077
PCT Pub. Date: Nov. 18, 2010

(65) Prior Publication Data
US 2012/0049495 A1 Mar. 1, 2012

(51) Int. Cl.
*B60R 21/16* (2006.01)
(52) U.S. Cl. ........ 280/735; 180/268; 180/273; 340/667; 297/468
(58) Field of Classification Search ............ 180/268, 180/271, 273; 280/735; 340/438, 667; 297/216.11, 297/468
See application file for complete search history.

(56) References Cited

U.S. PATENT DOCUMENTS

| | | | |
|---|---|---|---|
| 5,454,591 A | 10/1995 | Mazur et al. | |
| 5,581,234 A | 12/1996 | Emery et al. | |
| 6,809,643 B1 * | 10/2004 | Elrod et al. | ............... 340/539.1 |
| 6,942,248 B2 | 9/2005 | Breed et al. | |
| 7,012,533 B2 | 3/2006 | Younse | |
| 7,100,981 B2 | 9/2006 | Mack et al. | |
| 7,151,452 B2 | 12/2006 | Shieh | |
| 7,170,401 B1 | 1/2007 | Cole | |
| 7,171,026 B2 | 1/2007 | Shinada et al. | |
| 7,219,923 B2 | 5/2007 | Fujita et al. | |
| 7,233,239 B2 | 6/2007 | Chitalia et al. | |
| 7,321,306 B2 | 1/2008 | Lee et al. | |
| 7,439,866 B2 * | 10/2008 | Wallner et al. | ............. 340/573.1 |
| 8,179,274 B2 * | 5/2012 | Rork et al. | ................... 340/667 |
| 8,237,455 B2 * | 8/2012 | Griffin | ......................... 324/681 |
| 2004/0113797 A1 * | 6/2004 | Osborne | .................... 340/573.4 |
| 2004/0164856 A1 | 8/2004 | Mesina | |
| 2005/0092539 A1 * | 5/2005 | Chitalia et al. | ................ 180/271 |
| 2005/0121885 A1 | 6/2005 | Shieh | |

(Continued)

FOREIGN PATENT DOCUMENTS

| | | |
|---|---|---|
| EP | 1816025 A2 | 8/2007 |
| JP | 2007-126141 A | 5/2007 |

OTHER PUBLICATIONS

International Search Report and Written Opinion correlating to PCT/IB2009/052020 dated Feb. 17, 2010.

*Primary Examiner* — Toan To

(57) ABSTRACT

A child car seat for a land vehicle comprises a support for supporting at least a part of a body of a child, the support being positionable on a vehicle seat of the land vehicle and a restraint for holding the body in position relative to the support. A data processing unit forms when in operational mode and connected to an in-vehicle data communication network in the land vehicle, a child car seat network node in the in-vehicle data communication network. The seat includes a first network connector for establishing, in cooperation with a matching second network connector, a data communication connection between the child car seat network node and the in-vehicle data communication network. The child car seat has a signal carrier connecting the data processing unit to the first network connector.

16 Claims, 6 Drawing Sheets

U.S. PATENT DOCUMENTS

2007/0126566 A1 6/2007 Griffin et al.
2007/0284924 A1 12/2007 Gold et al.
2009/0051188 A1* 2/2009 Foussianes et al. ........ 296/65.01

* cited by examiner

CHILD CAR SEAT FOR A LAND VEHICLE

FIELD OF THE INVENTION

This invention relates to a child car seat and a land vehicle.

BACKGROUND OF THE INVENTION

It is well-known that many standard vehicle restraint systems do not adequately protect children from injury during vehicle collisions. For example, shoulder seat belts often do not adjust sufficiently to accommodate a child, sometimes resulting in the shoulder seat belt being dangerously positioned at the child's neck.

To remedy this problem, child car seats have become an increasingly popular way of properly restraining children during vehicle collisions, thereby reducing injuries resulting therefrom. Child car seats are know widely known and used as are the ways in which child car seats can be fastened to parts of the vehicle. For example, International Standards Organization (ISO) standard ISO 13216, more generally known as ISOFIX, specifies requirements for the fixation of child car seats in road vehicles.

However, a problem with the child car seats is that the known fixation systems can be attached in a faulty manner without the person attaching the child car seat is aware. This negatively affects the security enhancement supposed to be provided by the child car seat.

SUMMARY OF THE INVENTION

The present invention provides a child car seat and a land vehicle as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
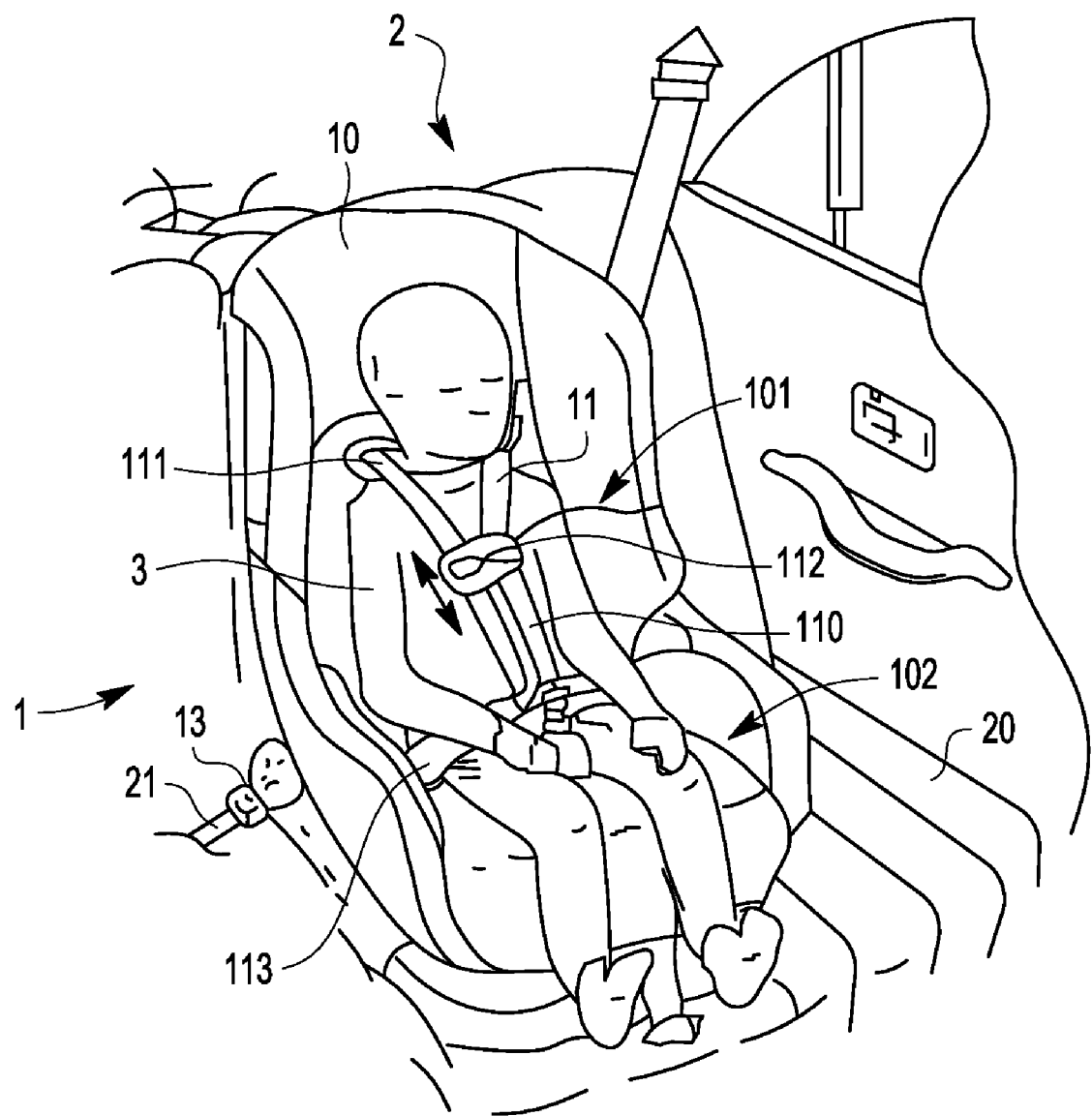
FIG. 1 schematically shows a perspective view of example of an embodiment of a child car seat.

Referring to FIG. 1, an example of a child car seat 1 is shown therein. In the example, a child 3 is shown seated in the child car seat 1, and the child car seat 1 is positioned on a vehicle seat 20 of a land vehicle 2, in this example a car.

The child car seat 1 includes a support 10 for supporting at least a part of a body 3 of a child. The support 10 can, as shown in FIG. 1, be positioned on the vehicle seat 20 of said land vehicle. In the shown example, the support 10 includes a back portion 101 which supports the upper part of the child body and a seat portion 102 on which the child is seated.

The child car seat 1 includes a restraint 11 for holding said body in position relative to said support. In the shown example the restraint 11 is implemented as a shoulder harness restraint, having two shoulder straps 110,111 which hold the body 3 in position relative to the support 10, and, provided that the support is properly fastened, prevent the child from being thrown around the vehicle during a collision. As shown in FIG. 1, the restraint 11 further includes a harness clip 112, as shown in FIG. 1. The clip 112 is designed to be slidable along the harness straps 110,111 to facilitate positioning of the harness straps. That is, the clip 112 can be slid to the lower end of the straps 110,111 while the harness straps are being positioned, and can be slid upwards, to the child's chest to hold the straps 110,111 together (i.e., in relative lateral positioning) during use. Such positioning of the clip 112 also facilitates use of the car seat 1 for a range of child sizes by always allowing the clip 112 to be properly positioned on the child's chest. As shown in FIG. 1, the restraint 11 may further include a lap strap 113 which extends, in use, over the legs of the child and to which a lower end of the straps 110,111 are attached in this example. It will be apparent that the child car seat 1 include other types of restraints.

Figure 2:
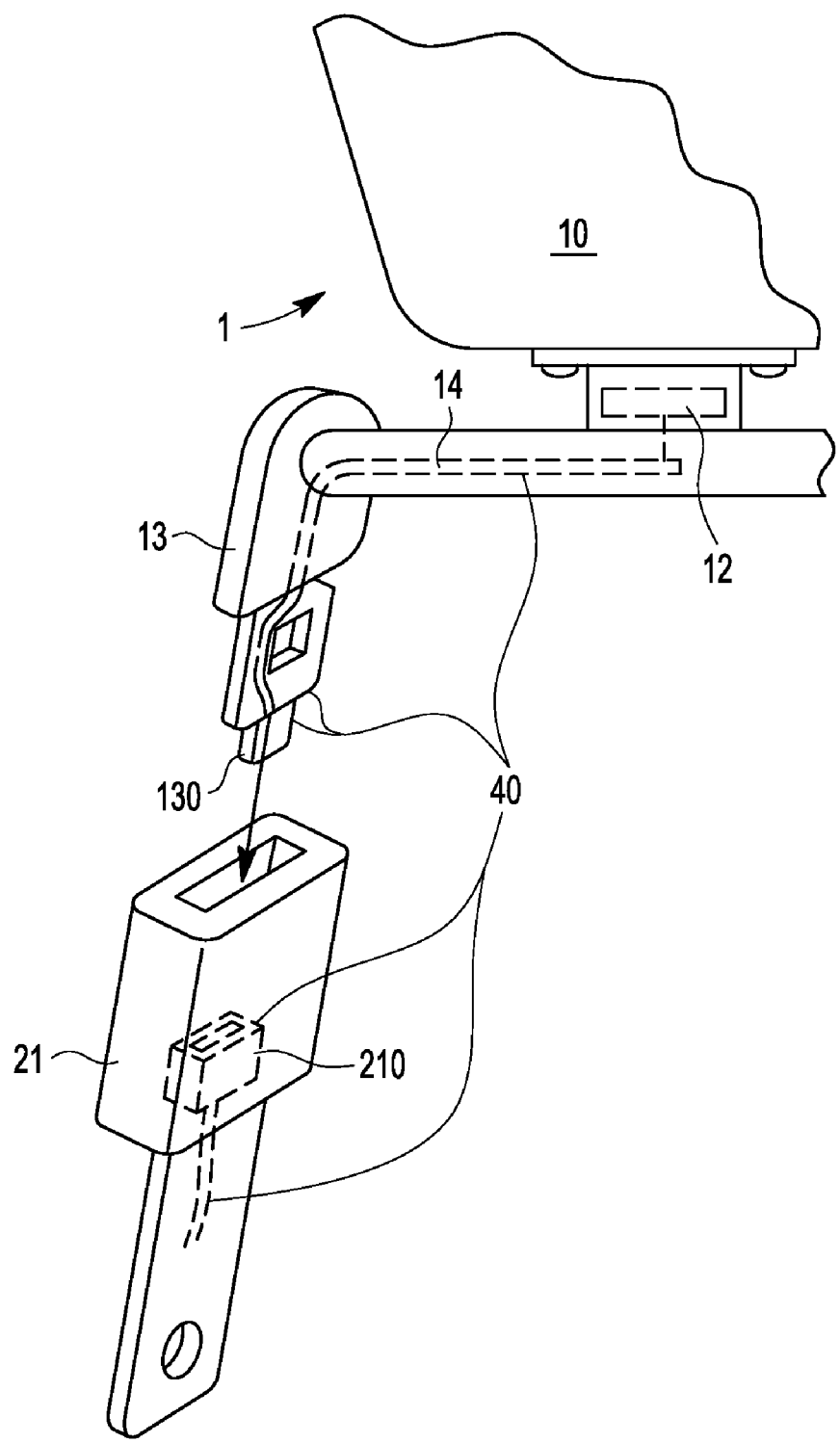
FIG. 2 schematically shows a perspective view of an example of an embodiment of a fastener and fastener attachment which can be used in the examples of FIGS. 1 and 3.

As shown in FIG. 2, the child car seat 1 may include a data processing unit 12. The data processing unit 12 may, when in operational mode and connected to an in-vehicle data communication network 4 in the land vehicle 2, form a child car seat network node 40 in the data communication network 4. It should be noted that the term 'node' as used in this application at least refers to any arrangement, including one or more elements, in a data communication network which provides network related functions and is administered in the network as an autonomous entity. For example, the node be individually addressable and may have a network address, such as an IP address. The node may be able to send and/or receive data to other nodes in the network, for example data compliant with a network protocol according to which the network operates, such as for example Universal Serial Bus, Internet Protocol, Controller-area network, Local Interconnect Network.

As shown in FIGS. 1 and 2, the child car seat 1 may include a fastener 13 which can be attached to a fastener attachment 21 in the vehicle 2, for holding the child car seat in position relative to the vehicle seat 20. In the shown example, the fastener 13 and the fastener attachment are implemented as a conventional seat-belt buckle. The fastener 13 in the example of FIG. 2 is a tongue. The fastener attachment 21 is implemented in this example as a housing with an opening which provides a path for receiving the tongue. It will be apparent, that some releasable locking mechanism may be provided in the housing which mechanically locks the tongue in the housing and which may be released if so desired, for example a movable retaining element which can be manually actuated.

In the example of FIGS. 1 and 2, the fastener 13 includes a first network connector 130. As shown in FIG. 2, a signal carrier 14 connects the data processing unit 12 to the first network connector 130. The first network connector establishes, in cooperation with a matching second network connector 210 included in the fastener attachment 21, a data communication connection 40 between the child car seat network node and the data communication network 4. In the shown example, the data communication connection is established only when the fastener 13 is attached correctly to the fastener attachment 21. In the shown example, for instance, first network connector 130 is implemented as a plug provided on the tongue shaped fastener 13 and connected to the data processing unit 12 via the signal carrier 14. The second network connector 210 is implemented as a socket provided in the housing which is connected to the in-vehicle network 4 via a network connection 211. The socket is positioned in the housing such that when the tongue is received in the housing, and locked, the plug is received in the socket, whereby an electrical communication path between the signal carrier 14 and the network connection 211 is established and the data processing unit 12 is connected to the in-vehicle data communication network 4.

It should be apparent that the fastener 13 and the fastener attachment 21, as well as the network connectors 130,210 may be implemented in any other manner suitable for the specific implementation. For example, the fastener and the network connector may be implemented separately. The fastener and fastener assembly may for example be an ISOFIX or LATCH assembly. Furthermore, instead of a wired data communication connection a wireless connection may be established, e.g. upon correct fixation of the fastener to the fastener attachment.

In the shown example, the data communication connection is established only when the fastener 13 is attached correctly to the fastener attachment 21 and the first connector 130 is included in the fastener 130.

Figure 3:
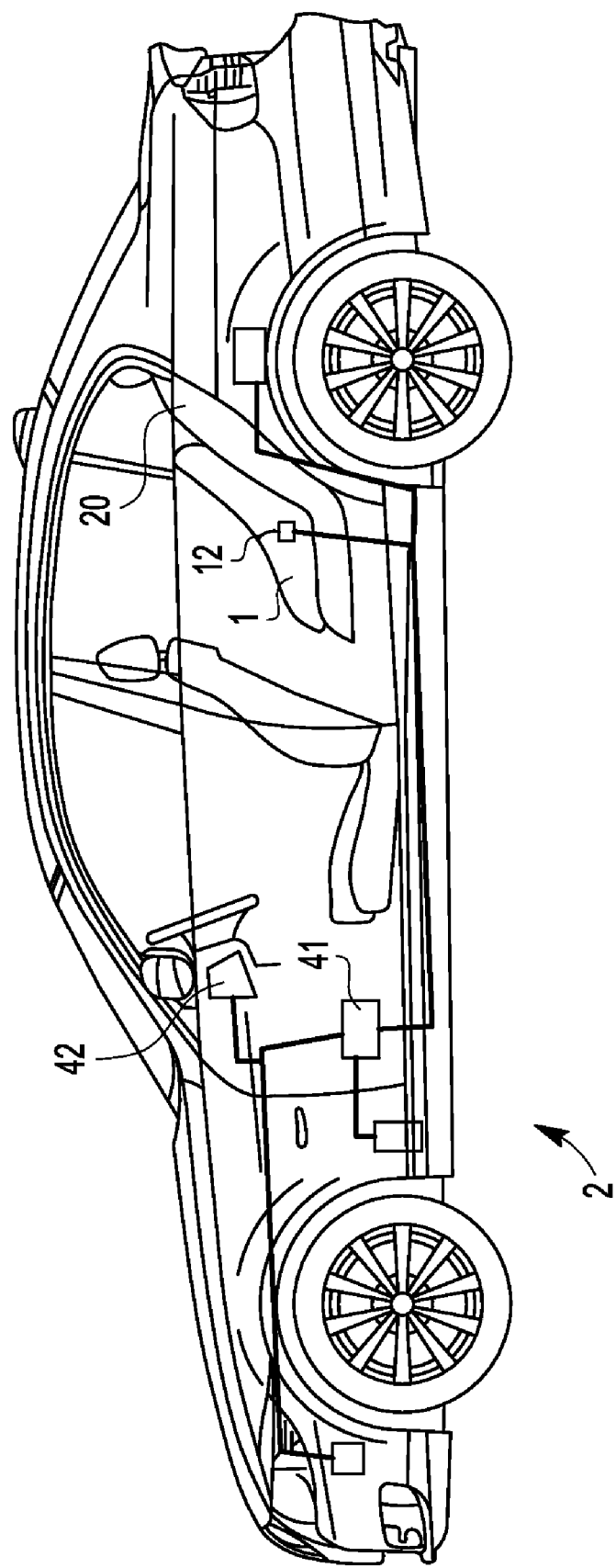
FIG. 3 schematically shows a side view of example of an embodiment of a land vehicle provided with a child car seat.

However, it will be apparent that the data communication may be established upon other conditions. For example, the data communication connection may be established when the first network connector comes within a predetermined distance from to the second network connection Referring to FIG. 3, the example of a land vehicle 2 shown therein is a road vehicle, more in particular a car. However, it will be apparent that the land vehicle 2 may be another type of land vehicle, such as an off-road vehicle or a utility vehicle. The land vehicle 2 may, as shown, comprise a vehicle seat 20 on which the child car seat 1 can be positioned. As shown in FIG. 2, a fastener attachment 21 may be present, for attaching the fastener 13 of the child car seat. The fastener 13 may be mechanically connected to, for example fixated, to the chassis of the land vehicle.

Figure 4:
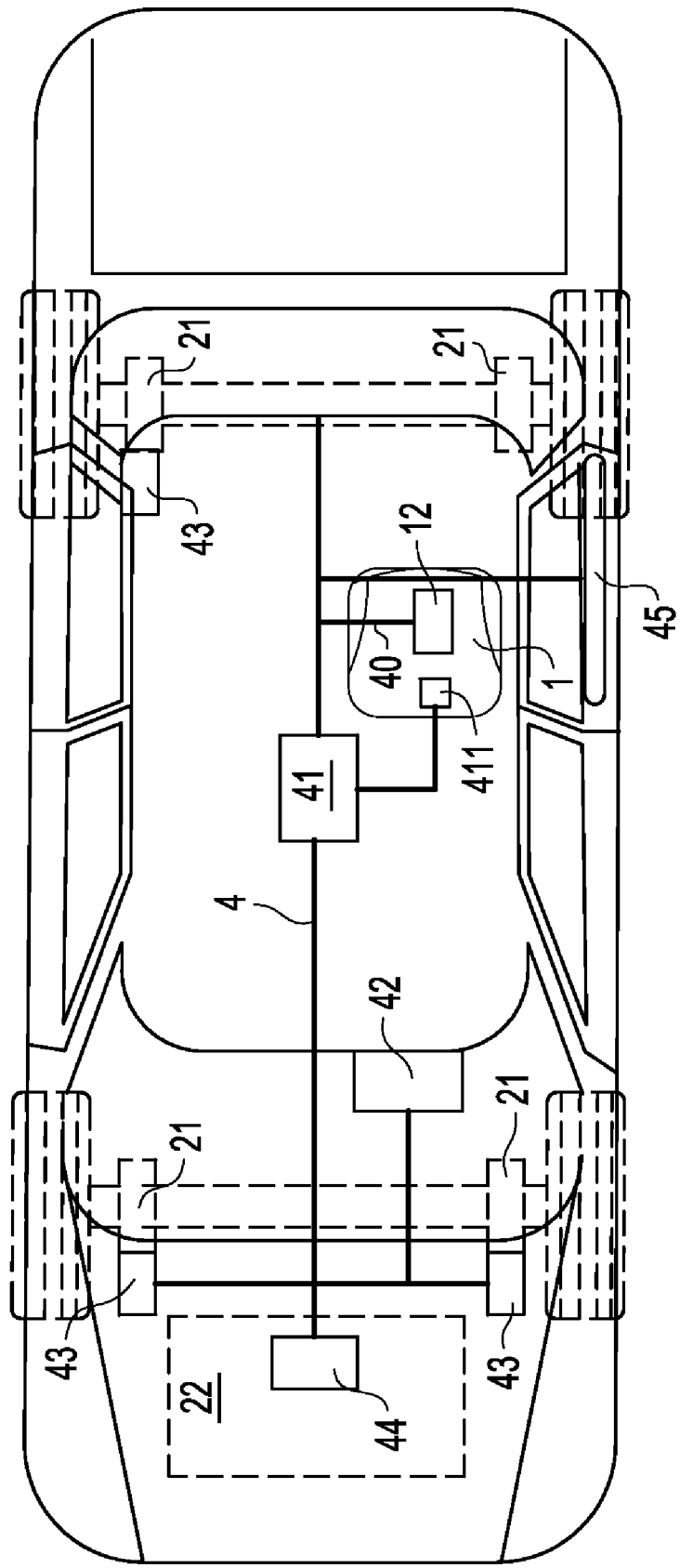
FIG. 4 schematically shows a diagram of an example of an embodiment of a data communication network in a land vehicle.

The land vehicle 2 may include an in-vehicle data communication network 4. As shown in FIG. 4, the in-vehicle data communication network 4 may include a detection network node 40 communicatively connected to the second network connector 210 and, when in use, detect a presence of the child car seat network node in the in-vehicle data communication network 4. As explained above, the land vehicle may include a second network connector 210. The second network connector 210 may establish, in cooperation with a, matching, first network connector 130 (in this example included in the fastener of the child car seat), a data communication connection 40 between the child car seat network node and the in-vehicle data communication network 4. As explained, the connection 210 may be implemented such that the data communication connection 40 is established when the fastener is attached correctly to the fastener attachment only.

It will be apparent that the in-vehicle data communication network 4 may include other nodes as well, such as for example a dashboard node 42, a brake control node 43 or an electronic control unit (ECU) node 44 or airbag control node 45. As illustrated in FIG. 4, the dashboard node 42 may. for example, control the man-machine interface on the dashboard of the vehicle, while the brake control node 43 may control the operation of brakes 21 of the car. The ECU node 44 may control the operation of the engine 22 and the airbag control node 45 may control the operation of one or more airbags.

Figure 5:
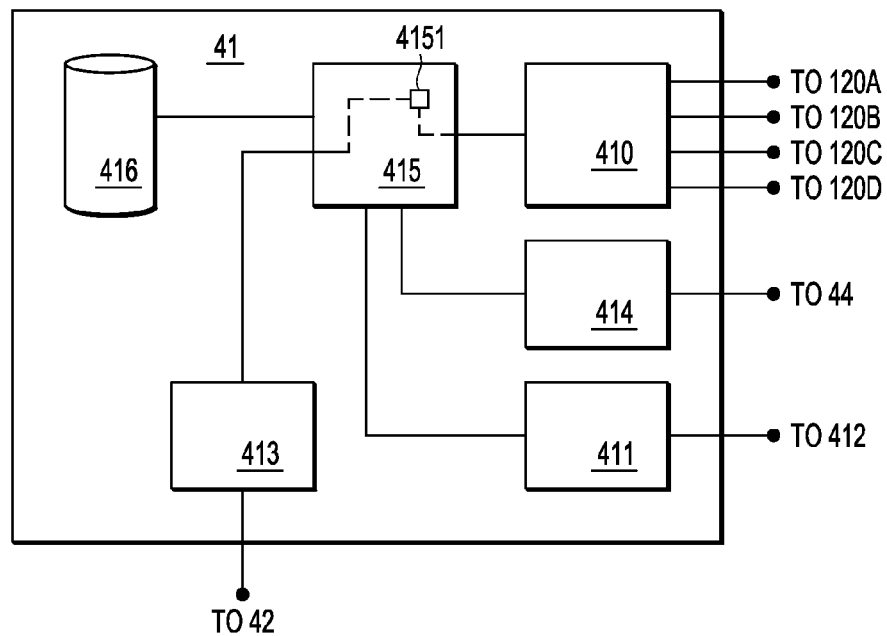
FIG. 5 schematically shows a block diagram of an example of an embodiment of a detection network node suitable for the example of FIG. 4.

The detection network node 40 may detect the presence of the child seat node in any manner suitable for the specific implementation. For example, the detection network node 40 may be periodically transmit a message through the in-vehicle data communication network 4, requesting a response from child seat nodes in the in-vehicle data communication network. As shown in FIG. 5, the detection network node 40 may include a seat node communication module 410 which repeatedly transmits such a message through the in-vehicle data communication network. Also, the data processing unit 12 may be configured to transmit a message identifying its presence to the other nodes in the in-vehicle data communication network in response to connection of the data processing unit 12 to the in-vehicle data communication network 4. However, any other suitable detection of the presence of a node in the in-vehicle data communication network may be used as well to detect the presence of a child seat node in the in-vehicle data communication network.

The presence of the child seat node in the in-vehicle data communication network 4 implies that a data communication connection is established between the data processing unit 12 and the in-vehicle data communication network 4. Accordingly, this implies that the first network connector 130 is correctly connected to the second network connector 210 and therefore that the fastener is correctly attached to the fastener attachment. The detection of the child seat node in the in-vehicle data communication network 4 thus enables to determine whether or not the child seat 1 is correctly fixated and enables an enhancement of the security provided by the child seat 1.

As explained below in more detail, the land vehicle 2 and/or the child seat 1 may be provided with features that further enhance the security and/or comfort of the child seat 1.

For example, as shown in FIG. 5, the detection network node 40 may. for example, include a control module 415 which decides whether or not a child seat is present, whether or not a child seat node is detected and a suitable action to be taken. For instance, in case a child seat is determine to be present but no child seat node is detected in the in-vehicle data communication network, e.g. no response message from a child seat node is received, the detection network node 40 may determine that the child seat is not correctly fastened. The detection network node 40 may then for instance output a warning message, e.g. in a for humans perceptible form or take other suitable safety enhancing measures (for example interrupt the ignition of the engine).

The detection network node 40 may detect the presence of the child car seat in any manner suitable for the specific implementation. The detection network node 40 may. for example, include a child seat presence detector module 411. The presence of a child seat may be detected in any manner suitable for the specific implementation. For example child seat presence detector module 411 may be connected to e.g. a child seat pressure detector 412 which senses the pressure exerted on the vehicle seat or an e-field sensor. The detection network node 40 may compare the sensed pressure with a criterion suitable to determine that a child seat is present, for example determine whether or not the sensed pressure or an e-field is in a range typical for child seat.

However, it will be apparent that the detection network node 40 may detect the presence of the child car seat in another manner and that the child seat presence detector module 411 may be implemented in any manner suitable for the specific implementation. For example, the child seat presence detector module 411 may be integrated, together with other control modules, in the control module 415 or be implemented separately.

The child seat presence detector module 411 may. for example, be integrated in the control module 415 in case the child seat and the land vehicle have multiple sets of fasteners and corresponding fastener attachments, provided with respective first network connectors and second network connectors. (However, in such case the child seat presence detector module 411 may be implemented as a separate module as well.) The detection network node 40 may then, as shown in FIG. 5, include multiple ports connected to the seat node communication module 410, each for a respective second network connector 120a-120d. The seat node communication module 410 may. for example, receive from the data processing unit 12 messages over the data communication paths through the respective second network connector 120a-120d. In case the seat node communication module 410 receives the message via some paths, but not all, the control module 415 may detect the presence of the child seat node in the in-vehicle data communication network, and hence determine that a child seat is present, but that some of the fasteners are not attached correctly.

The detection network node may. for example, detect a faulty attachment of the fastener based on one or more parameters of the data communication connection, e.g. in this example the fastener attachments corresponding to the ports at which no message is received from the child seat node 12. The control module 415 may then output via a communication module 414, e.g. to the dashboard node 42, a message indicating this fault and based on the port on which no message is received, an identification of which specific fastener is not attached correctly or take another action suitable for the specific implementation.

The detection network node may use information one or more parameters of the data communication connection between the child seat node 12 and the in-vehicle data communication network 4 in any other manner as well. For example, the land vehicle may include an airbag system with one or more airbags 44, as shown in FIG. 4 in more detail. As shown in FIG. 5, the network detection network node 41 may include a memory 416 in which data is stored representing one or more predefined set of: a location of the child car seat network node and one or more airbags 44 associated with the location. The network detection network node 41 may further include a localization module 4151. The localization module 4151 may determine, in response to a detection of the child car seat network node, a location of the child car seat network node. For example, the localization module 4151 may determine, e.g. from the ports at which messages from the child seat node 12 are received, the paths, via which the messages have been transported and hence the second connectors and fasteners attachments to which the child seat node is connected. The localization module 4151 may determine the location from the thus obtained information. For example, if this determination yields that the child seat node 12 is connected to attachments on both sides of the front passenger seat, the localization module 4151 may determine that the child seat 1 is positioned on the front passenger seat. The location may be determined in any other manner suitable for the specific implementation, for example by determining whether or not a a message is received with a ID tag unique for the specific location, e.g. for the front passenger seat.

As shown, the network detection network node 41 may include an airbag controller module 414 connected to the localization module and 4151 and the memory 416 (indirectly in the example) and determine from the data a set corresponding to the determine location and to disable one or more airbags associated with the location in the set. E.g. in the example given, the airbag controller module 414 may disable the airbags for the front passenger seat.

It will be apparent that once the child seat node is detected, a communication between the child seat node and the detection network node or other nodes in the in-vehicle data communication network may be established, and an interaction between the child seat node and the detection network node or other nodes in the in-vehicle data communication network may be obtained. The communication may. for example, depending on the application. be simplex, half-duplex or full duplex. In addition to allowing communication, the data communication connection 40 may provide a connection for the child car seat 1 and the child seat network node to a power source, such as to a battery of the vehicle 2.

The in-vehicle data communication network may. for example, include a control node for generating a control signal in response to data received from the child car seat network node. The control signals may. for example, be signals which control actuators connected to the control node, and for example be signals which control devices connected to the control node, such as actuators or man-machine interfaces. For example, in response to an the incorrect attachment and the presence of a child, the control node may disable engine ignition and other safety features such as, but not limited to; airbag disablement, child weight alarm and belt buckle detection.

However, the control signals may also be other types of control signals and control other types of devices, such as other nodes in the network.

Also, the detection network node 41 may operate as the control node, and the control module 415 may. for example, generate suitable control messages. The data may. for example, be based on one or more sensed parameters of the child car seat or of an environment of the child car seat, such as, as explained above, for example the paths used for the communication between the child seat node and the detection network node. The control messages may. for example, contain command data and be transmitted to the child car seat network node, in order to have the child car seat network node perform actions corresponding to the command data.

However, other aspects may be used as well such as information obtained from sensors integrated in the child seat and connected to the data processing unit 12 or from sensors integrated in the vehicle connected to e.g. the detection network node 41 or other nodes in the in-vehicle data communication network. For example, pressure sensors in the vehicle seat may sense the pressure, or e-field sensors may sense the e-field, exerted on the vehicle seat 20 by the child seat 1 and determine from this sensed pressure whether or not the seat is correctly fitted. For instance, in case no pressure or very little is sensed on the back rest of the vehicle seat 20, this implies that the child seat is not positioned sufficiently towards the back of the vehicle seat 20 and the detection network node 41 or another suitable node in the in-vehicle data communication network may output a warning message, for example in a for humans perceptible form to a dashboard 42 or take another suitable action.

Also, for example, a pressure sensor may be present in the vehicle which senses the weight of the child seat exerted on the vehicle seat and the responsible node may control the seat belt tensioning in event of a crash to be appropriate for the sensed weight, e.g. in a manner similar as regular seat belts. It should be noted that in addition or alternatively a pressure sensor may be provided in the child seat 1, as e.g. illustrated in FIG. 6 where a pressure sensor 151 is shown connected to the data processing unit 12.

The data processing unit 12 may be implemented in any manner suitable for the specific implementation. In the shown example, the data processing unit 12 includes a central processing unit 123 connected via a bus 127 to one or more peripheral modules 124-126, which in this example include an network communication module 124, a digital to analogue converter (DAC) 125 and an analogue to digital converter (ADC) 126. It will be apparent that other peripheral modules may be present as well and that the data processing unit 12 may be implemented in a different manner.

Figure 6:
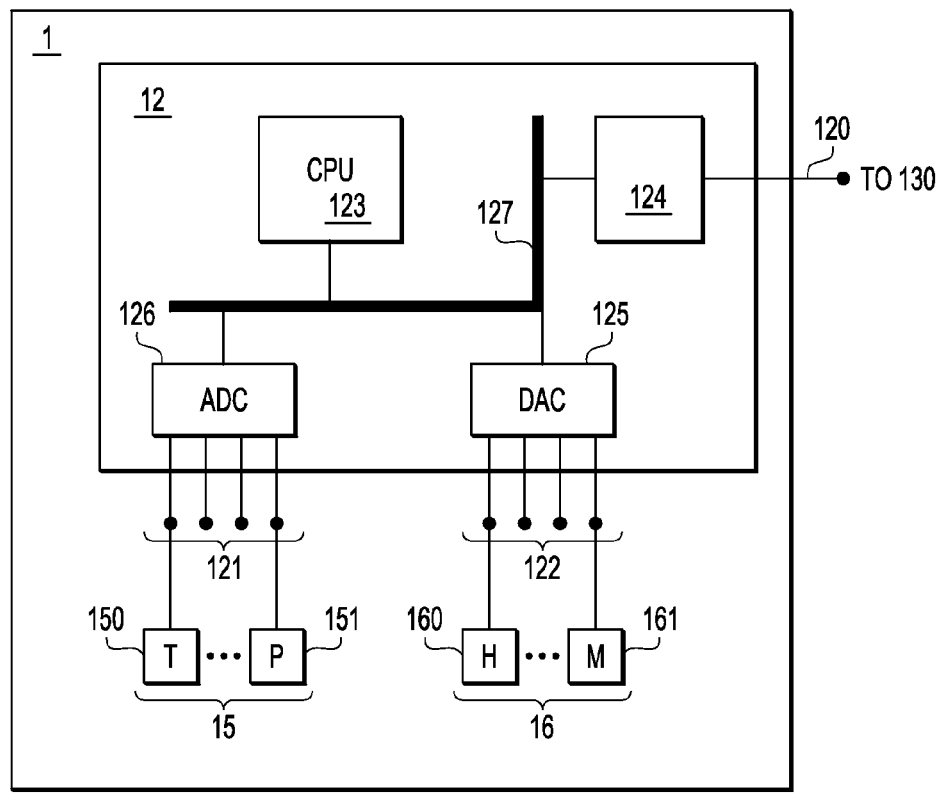
FIG. 6 schematically shows a block diagram of an example of an embodiment of a child car seat network node suitable for the example of FIG. 4.

As shown in FIG. 6, the data processing unit 12 may include an ADC 126 which is connected to inputs 121 of the data processing unit. The inputs 121 may in turn be connected to respective sources of analog signals, such as a set 15 of sensors 150,151. The child car seat may include a set 15 of one or more sensors for sensing a parameter of the child car seat or an environment of the child car seat, such as a pressure sensor 151 or a temperature sensor 150. As shown in FIG. 6, for example, the sensor 15 may be connected to the data processing unit 12 and the data processing unit i12 may be configured to generate data based on the sensed parameter and to transmit the data to one or more other node in the data communication network. It will be apparent that the sensors may also provide other types of signals, e.g. digital signals in which case the ADC 126 could be omitted and that other sources of signals may additionally or alternatively be connected to the data processing unit 12.

The sensors 150,151 may. for example, include a pressure sensor (P) 151 which senses the weight of a body exerted on the seat. The CPU 123 or another processing module, may determine from the weight of the body as represented by the signals received from the pressure sensor 151, a suitable tension of the seat belt or instruct the communication unit 124 to transmit a message containing data representing the sensed pressure to another node in the in-vehicle data communication network 4. Also, for example, a temperature sensor (T) 150 may be present which enables the data processing unit 12 to receive e.g. information about the temperature and control a child seat heating The child car seat may include a set 16 of one or more actuators 160,161 for controlling an aspect of the child car seat. The data processing unit may be configured to control the actuator based on command data received from one or more other node in the in-vehicle data communication network. As shown in FIG. 6, for example, the set 16 may be connected to outputs 122 of the data processing units 12. Via the outputs 122, the data processing unit 12 may output control signals to the actuators, in order to have the respective actuator perform a certain action. For example, the CPU 123 may generate suitable control signals, for example based on the information obtained from the sensors or in response to command messages received from the in-vehicle communication network.

For example, the actuators may include a heating element (H) 160 and a motor (M) 161. The heating element 160 may. for example, be controlled by the data processing unit 12 based on the sensed temperature sensed by the temperature sensor 150, in order to provide a pleasant ambient temperature to a child seated in the seat. The motor 161 may. for example, be a tilting motor which controls the tilting of the car child seat 1. The motor 161 may in such case be controlled by the data processing unit based on data received from the network, which for example data about the acceleration or deceleration of the vehicle, such that the position of the seat 1 is corrected for tilting of the vehicle. It will be apparent that other actuators may be present and that the actuators may be controlled by the data processing unit 12 in any manner suitable for the specific implementation.

Figure 7:
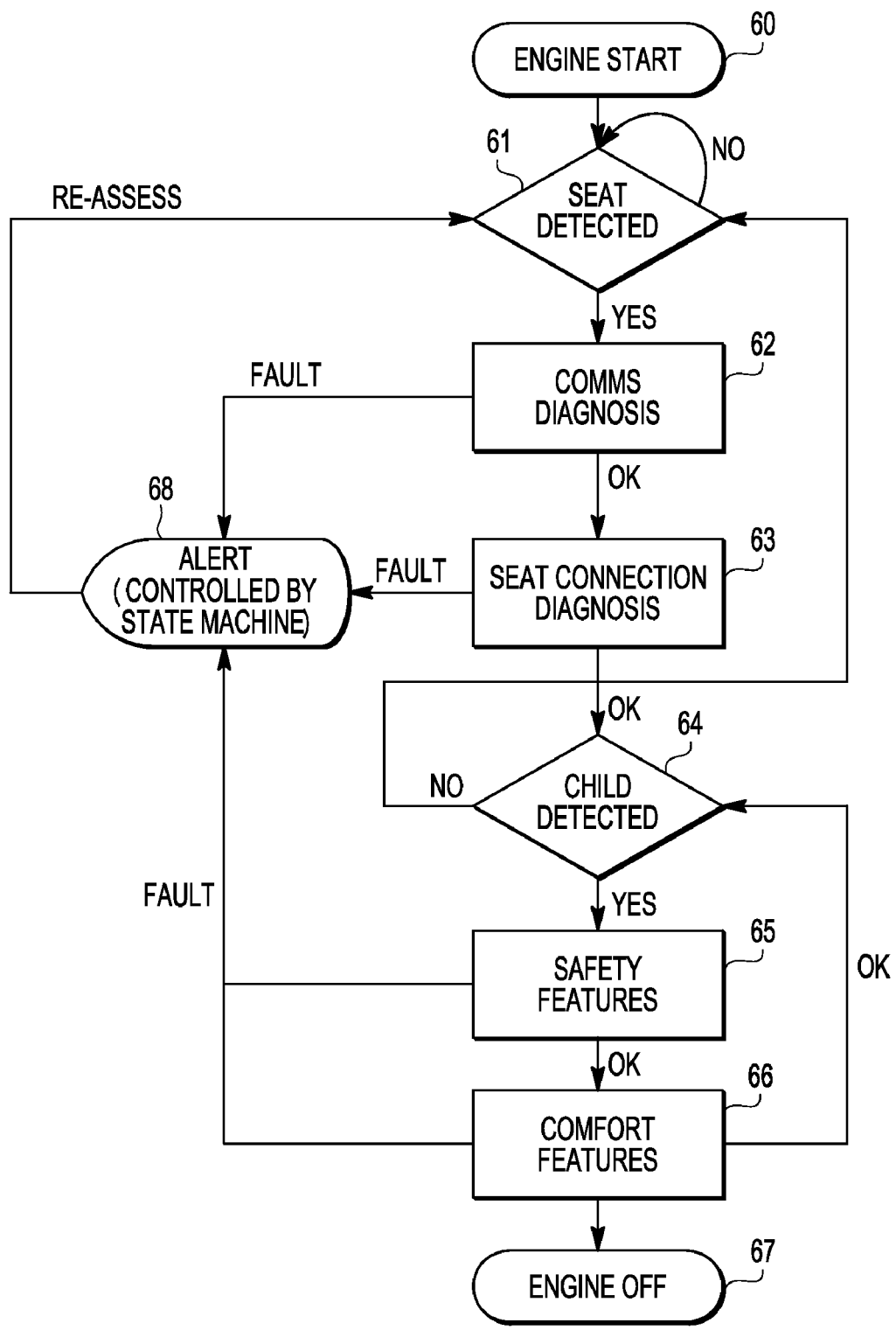
FIG. 7 shows a flow-chart of an example of a method for fastening a child car seat and communication between a child seat node and an in-vehicle data communication network.

Referring to FIG. 7, a method as may be performed, for example by the child car seat 1 and/or the vehicle 2 is illustrated. As shown with block 60, the method may started with an engine start, after which a seat detection may be performed, as illustrated with block 61. As shown, if a seat is detected, a communication diagnosis may be performed, as illustrated with block 62. For example, the communication may be checked for the speed, the noise level or a handshake procedure e.g. as specificed in the communication protocol may be performed. Also, diagnostic data may be sent and checked for e.g. the number of bit errors. As shown, if the communication diagnosis yields that the communication is operating properly, a seat connection diagnosis is performed, as illustrated with block 63. As explained above, the seat connection diagnosis may. for example, include receiving or sending diagnostic messages from or addressed to the child seat network node through the network 4. If the communication diagnosis or the seat connection diagnosis reveals a fault, an alert may be outputted, as illustrated with block 68, and the operation may be restarted at the seat detection, as indicated with the arrow from block 68 to block 61 in FIG. 7.

As illustrated with block 64, the method may further include detection whether or not a child is present. In the example of FIG. 7, this is illustrated to be performed after both the communication diagnosis and the seat connection diagnosis, when those do not reveal any faults. However it will be apparent that the child detection may be performed before or in parallel therewith. As illustrated with block 65, when a child is detected and both the communication diagnosis and the seat connection diagnosis do not reveal any faults, safety and comfort enhancing operations may be performed, for example including the use of sensors and/or actuators as explained above.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via existing or new, wired or wireless, intermediate devices. Accordingly, unless implied or stated otherwise the connections may. for example, be direct connections or indirect connections.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 4 and the discussion thereof describe an exemplary network architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, in the example of FIG. 5, the node 41 may double as the rear airbag controller node with the described application embedded in the firmware using the same hardware, or it could be a standalone node controlling one seat position or up to car capacity less one driver.

Also, devices functionally forming separate devices may be integrated in a single physical device. For example, the seat node communication module 410 and the a communication module 414 may be integrated in a single communication module. Also, for example the detection network node 41 and/or the data processing unit 12 may be implemented as a single integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A child car seat for a land vehicle comprising:
    a support for supporting at least a part of a body of a child, said support being positionable on a vehicle seat of said land vehicle;
    a restraint for holding said at least said part of said body in position relative to said support;
    a data processing unit which, when in operational mode and connected to an in-vehicle data communication network in said land vehicle, forms a child car seat network node in said in-vehicle data communication network;
    a fastener which can be attached to a fastener attachment in said land vehicle, for holding said child car seat in position relative to said vehicle seat:
    a first network connector for establishing, in cooperation with a matching second network connector, a data communication connection between said child car seat network node and said in-vehicle data communication network; and
    a signal carrier connecting said data processing unit to said first network connector.

2. A child car seat as claimed in claim 1, wherein said first network connector is arranged to establish, in cooperation with said matching second network connector, said data communication connection between said child car seat network node and said in-vehicle data communication network when said fastener is attached correctly to said fastener attachment only.

3. A child car seat as claimed in claim 1, comprising:
    at least one sensor for sensing a parameter of said child car seat or an environment of said child car seat, wherein said sensor is connected to said data processing unit and wherein said data processing unit is configured to generate data based on said sensed parameter and to transmit said data to at least one other node in said in-vehicle data communication network.

4. A child car seat as claimed in claim 1, wherein said child car seat comprises:
    at least one actuator for controlling an aspect of said child car seat, wherein said data processing unit is configured to control said actuator based on command data received from at least one other node in said in-vehicle data communication network.

5. A land vehicle, comprising:
    a vehicle seat on which a child car seat according to claim 1, can be positioned;
    an in-vehicle data communication network;
    a fastener attachment for attaching said fastener of said child car seat;
    a second network connector, for establishing, in cooperation with a matching first network connector of said child car seat, a data communication connection between said child car seat network node and said in-vehicle data communication network; and
    said in-vehicle data communication network comprising a detection network node communicatively connected to said second network connector, wherein said detection network node is configured to detect a presence of said child car seat network node in said in-vehicle data communication network.

6. A land vehicle as claimed in claim 5, wherein said second network connector is arranged to establish, in cooperation with said matching first network connector, said data communication connection between said child car seat network node and said in-vehicle data communication network when said fastener is attached correctly to said fastener attachment only.

7. A land vehicle as claimed in claim 5, wherein:
    said land vehicle includes an airbag system with at least one airbag; and said network detection network node includes:
- a memory in which data is stored representing at least one predefined set of a location of said child car seat network node and at least one airbag associated with said location,
- a localization module for determining, upon or after detection of the child car seat network node, a location of said child car seat network node, and
- an airbag controller module, connected to said localization module and said memory, and configured to determine from said data a set corresponding to said determined location of the child car seat network node and to disable at least one airbag associated with said location in said set.

8. A land vehicle as claimed in claim 7, wherein said detection network node is configured to detect a faulty attachment of said fastener based on at least one parameter of said data communication connection.

9. A land vehicle as claimed in claim 5, wherein said an in-vehicle data communication network includes a control node for generating a control signal in response to data received from said child car seat network node, wherein said data is based on at least one sensed parameter of said child car seat or an environment of said child car seat.

10. A land vehicle as claimed in claim 5, wherein said in-vehicle data communication network includes a command node for generating command data and transmitting said command data to said child car seat network node.

11. A land vehicle, comprising:
- a vehicle seat;
- an in-vehicle data communication network;
- a child car seat comprising
  - a support for supporting at least a part of a body of a child, wherein said support is positionable on the vehicle seat,
  - a fastener configured to hold said child car seat in position relative to said vehicle seat,
  - a data processing unit configured to form a child car seat network node, and
  - a first network connector configured to establish a data communication connection between said child car seat network node and said in-vehicle communication network;
- a fastener attachment configured to couple with said fastener of said child car seat;
- a second network connector, coupled with said first network connector, and configured to establish a data communication connection between said child car seat network node and said in-vehicle data communication network; and
- a detection network node, communicatively coupled with said second network connector, and configured to detect a presence of said child car seat network node in said in-vehicle data communication network.

12. The land vehicle of claim 11, wherein said data communication connection between said child car seat network node and said in-vehicle data communication network is established only when said fastener is attached correctly to said fastener attachment.

13. The land vehicle of claim 11 further comprising:
at least one sensor for sensing a parameter of said child car seat or an environment of said child car seat, wherein
- said at least one sensor is connected to said data processing unit, and
- said data processing unit is further configured to generate data based on said sensed parameter and transmit said data to at least one other node in said in-vehicle data communication network.

14. The land vehicle of claim 11 further comprising:
at least one actuator for controlling an aspect of said child car seat, wherein
- said data processing unit is further configured to control said actuator based on information received from at least one other node in said in-vehicle data communication network.

15. The land vehicle of claim 11 further comprising:
an airbag system comprising at least one airbag; and
said detection network node comprises:
- a memory storing data representing at least one predefined set of a location of said child car seat network node and at least one airbag associated with said location,
- a localization module for determining, upon or after detection of the child car seat network node, a location of said child car seat network node, and
- an airbag controller module, connected to said localization module and said memory, and configured to determine from said data the set corresponding to said determined location of the child car seat network node and to disable the at least one airbag associated with said location.

16. A land vehicle as claimed in claim 15, wherein said detection network node is further configured to detect a faulty attachment of said fastener based on at least one parameter of said data communication connection.

* * * * *